(12) United States Patent
Kim

(10) Patent No.: US 10,036,112 B2
(45) Date of Patent: Jul. 31, 2018

(54) TUB FOR WASHING MACHINE, APPARATUS AND METHOD OF MANUFACTURING

(71) Applicant: Dongbu Daewoo Electronics Corporation, Seoul (KR)

(72) Inventor: In Dong Kim, Seoul (KR)

(73) Assignee: DONGBU DAEWOO ELECTRONICS CORPORATION, Seoul (KR)

( * ) Notice: Subject to any disclaimer, the term of this patent is extended or adjusted under 35 U.S.C. 154(b) by 561 days.

(21) Appl. No.: 14/596,232

(22) Filed: Jan. 14, 2015

(65) Prior Publication Data

US 2016/0130738 A1    May 12, 2016

(30) Foreign Application Priority Data

Nov. 10, 2014 (KR) .................. 10-2014-0155148

(51) Int. Cl.
| | |
|---|---|
| D06F 37/26 | (2006.01) |
| B29C 45/00 | (2006.01) |
| D06F 39/08 | (2006.01) |
| D06F 23/04 | (2006.01) |
| B29L 31/00 | (2006.01) |

(52) U.S. Cl.
CPC ............ *D06F 37/262* (2013.01); *B29C 45/00* (2013.01); *D06F 37/26* (2013.01); *B29L 2031/762* (2013.01); *D06F 23/04* (2013.01); *D06F 39/083* (2013.01)

(58) Field of Classification Search
None
See application file for complete search history.

(56) References Cited

U.S. PATENT DOCUMENTS 5,167,898 A * 12/1992 Luther ................ B29C 33/0033
249/145
6,070,439 A   6/2000 Jung

FOREIGN PATENT DOCUMENTS

| CN | 1242446 A | | 1/2000 |
|---|---|---|---|
| CN | 101008147 A | | 8/2007 |
| GB | 2286406 A | | 8/1995 |
| KR | 20-1989-006578 | * | 5/1989 |
| KR | 20-1989-0006578 | | 5/1989 |
| KR | 20-1995-0047619 | * | 7/1997 |
| KR | 2019970039156 | | 7/1997 |
| KR | 10-2000-0004067 | | 1/2000 |
| KR | 20000004067 A | | 1/2000 |

* cited by examiner

*Primary Examiner* — Michael Barr
*Assistant Examiner* — Jason Riggleman

(57) ABSTRACT

According to a tub for a washing machine according to an exemplary embodiment of the present disclosure, a bottom portion, an outer side wall portion, an inner side wall portion, a water flow passage side wall are integrally formed by injection molding so as to form a water flow passage. An apparatus and a method of manufacturing the tub for a washing machine according to the exemplary embodiment of the present disclosure allow the bottom portion, the outer side wall portion, the inner side wall portion, and the water flow passage side wall to be integrally formed by injection molding.

2 Claims, 8 Drawing Sheets

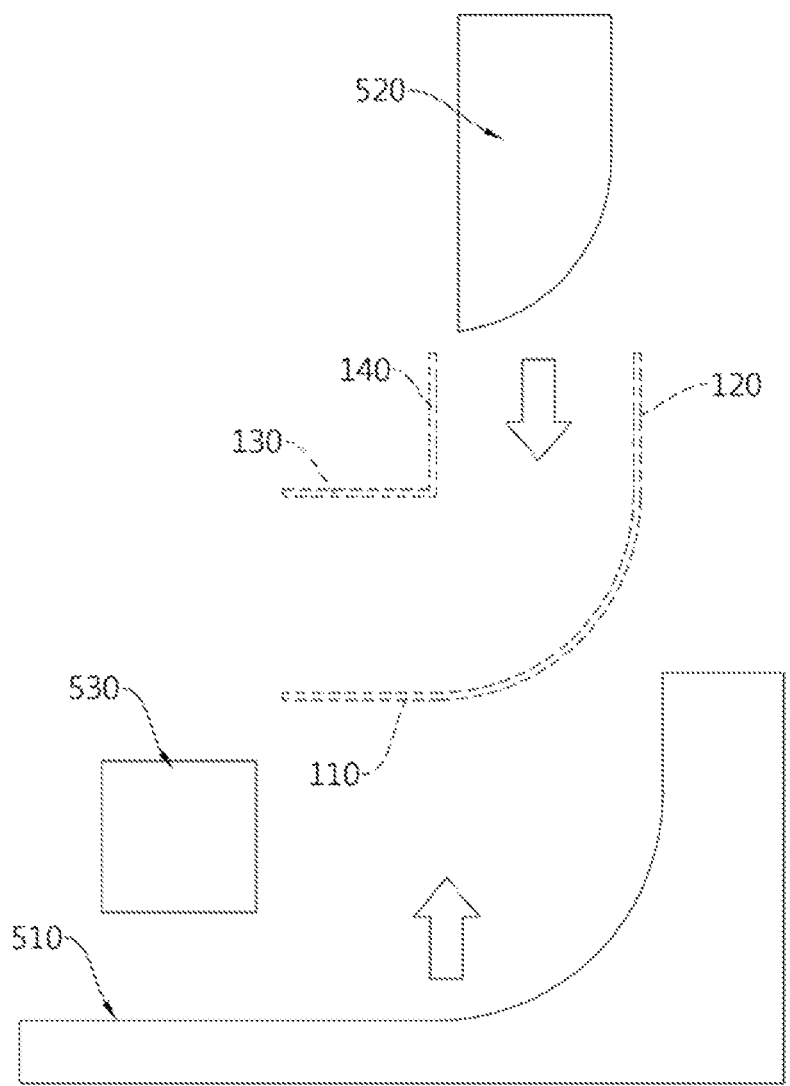

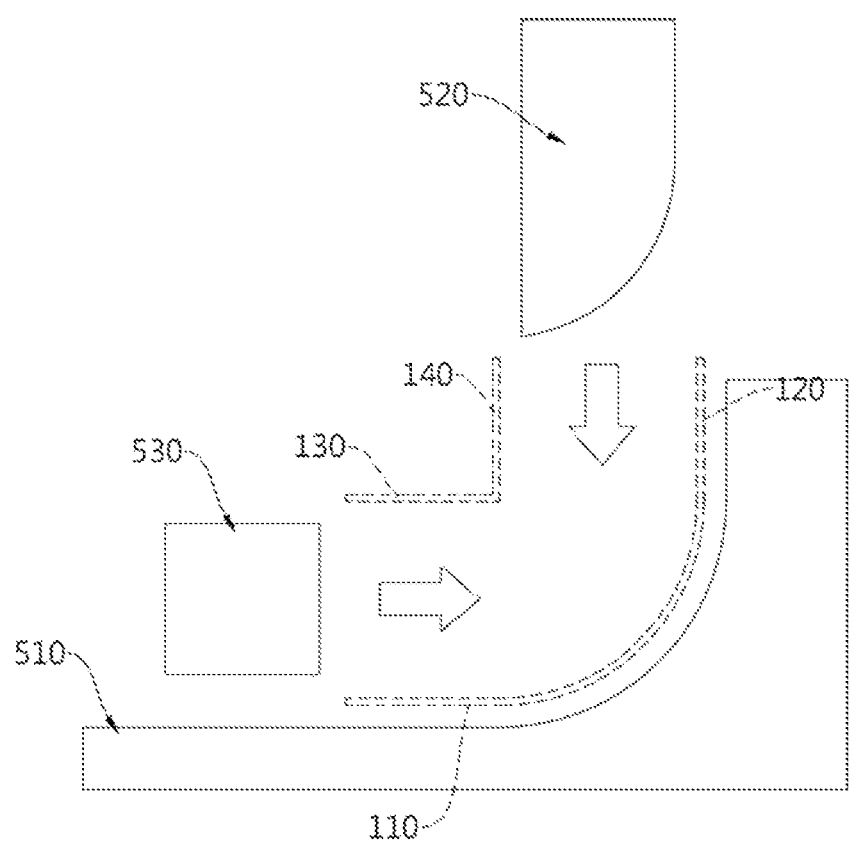

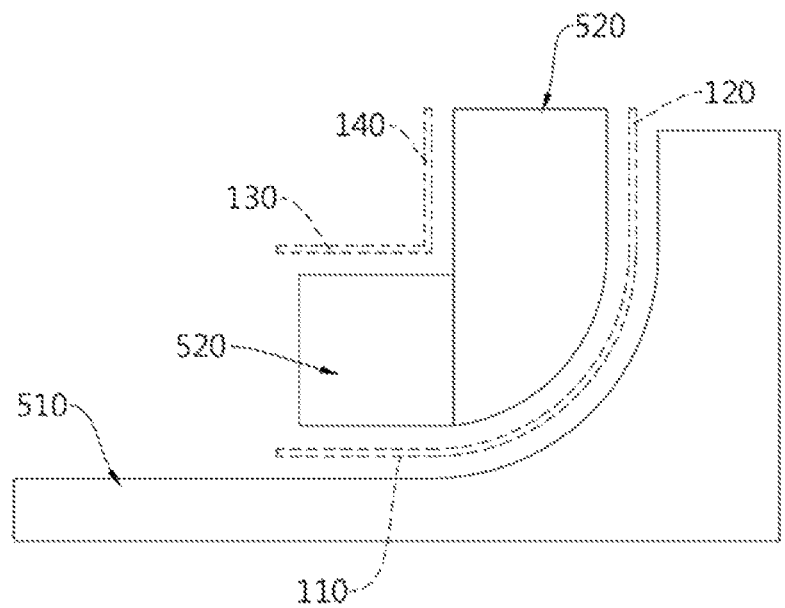
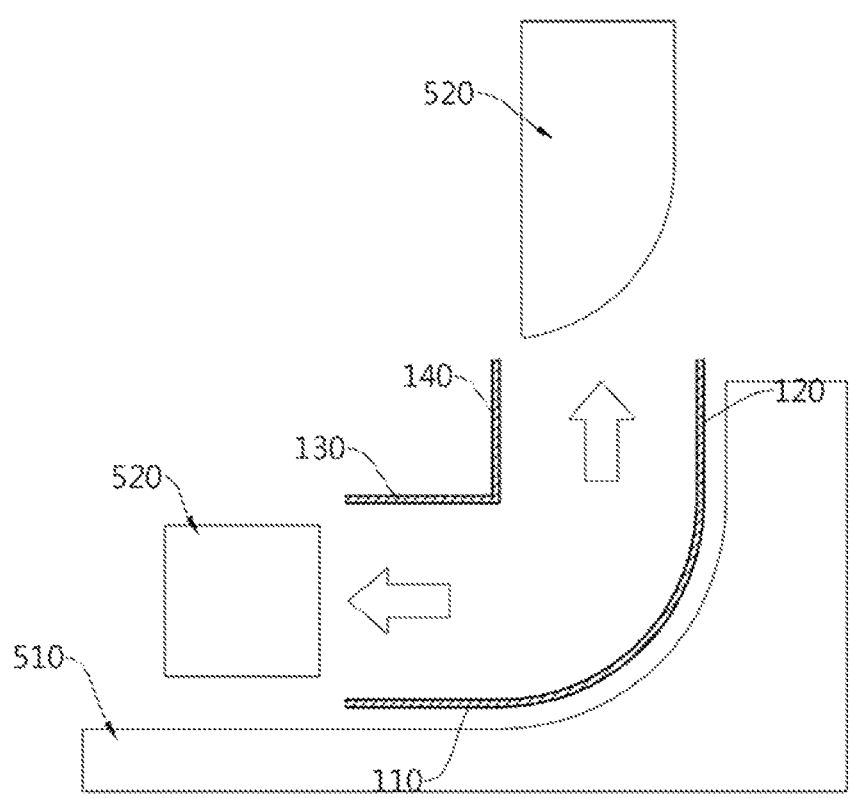

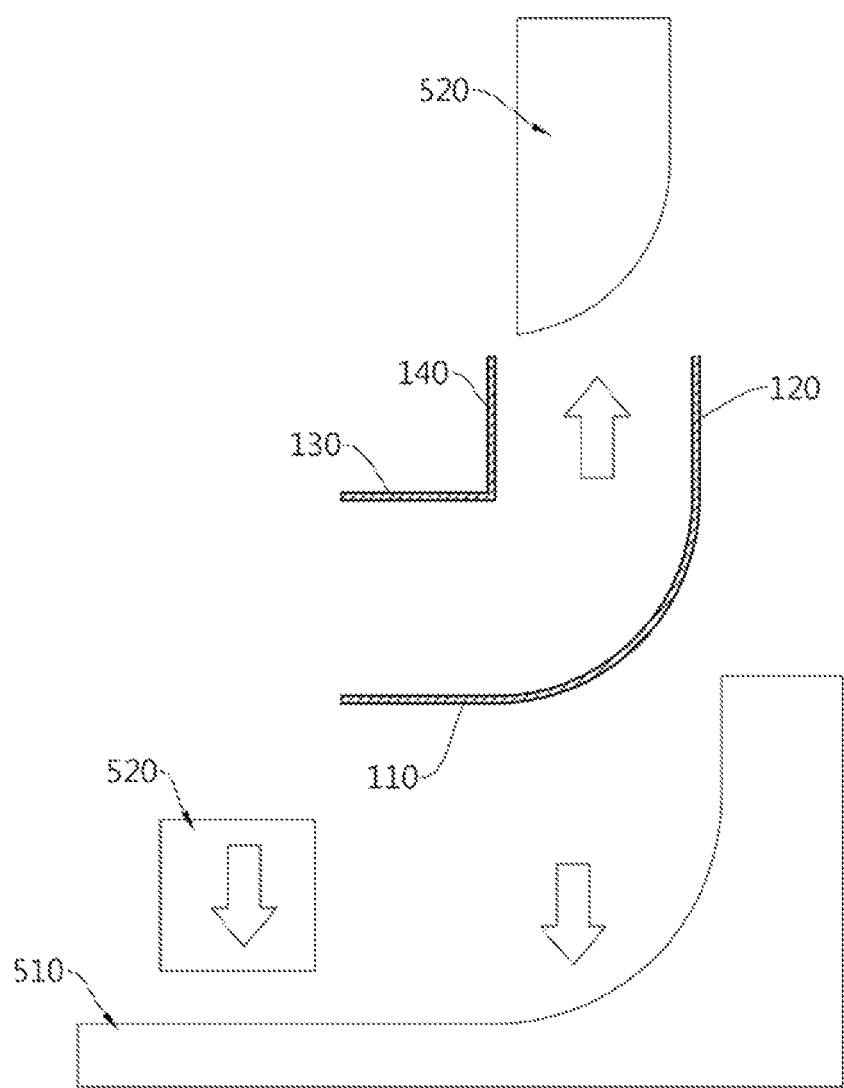

TUB FOR WASHING MACHINE, APPARATUS AND METHOD OF MANUFACTURING

CROSS-REFERENCE TO RELATED APPLICATION

This application claims priority to Korean Patent Application No. 10-2014-155148, filed on 10 Nov. 2014, with the Korean Intellectual Property Office, the disclosure or which is incorporated herein in it entirety by reference.

TECHNICAL FIELD

The present disclosure relates to a tub for a washing machine, an apparatus for manufacturing the tub, and a method of manufacturing the tub, and more particularly, to a tub for a washing machine in which an L-shaped water flow passage is formed, an apparatus for manufacturing the tub, and a method of manufacturing the tub.

BACKGROUND

In general, an L-shaped water flow passage may be formed in a tub for a washing machine. Two or more components are assembled to form the L-shaped water flow passage in the tub in the related art.

A tub 10 in the related art will be described in more detail with reference to FIGS. 1 and 2. The attached FIG. 1 is a view for explaining a tub for a washing machine in the related art. FIG. 2 is a view for explaining a configuration of a water flow passage in the tub for as washing machine in the related art.

The tub 10 in the related art has a side wall portion 14 that is formed to be extended along an outer circumference of a bottom portion 12. First and second water flow passage walls 21 and 22 are formed at an upper side of the bottom portion 12 and at an inner side of the side wall portion 14. A water flow passage cover 50, which is separately manufactured, is provided.

The water flow passage cover 50 is assembled to the tub 10 in a shape that is covered by the aforementioned first and second water flow passage walls 21 and 22. According y, a water flow passage 30 is formed by as part of the bottom portion 12, the side wall portion 14, the first and second water flow passage walls 21 and 22, and the water flow passage cover 50.

An inlet 31 of the water flow passage 30 is formed in the bottom portion 12, and an outlet 32 of the water flow passage 30 is formed toward the upper side of the side wall portion 14.

Thereafter, when the tub 10 is assembled to the washing machine, a pulsator is disposed at the upper side of the bottom portion 12 and rotates, and a water current flows along the water flow passage 30 by rotation of the pulsator.

However, the following problems are pointed out regarding the tub 10 for a washing machine in the related art.

In the case of the tub 10 in the related art, there is an inconvenience in that the water flow passage cover 50 needs to be separately provided in the tub 10 as described above.

In the case of the tub 10 in the related art, because there is a process of assembling the water flow passage cover 50 to the tub 10, a manufacturing process is complicated, and manufacturing costs are increased.

In the case of the tub 10 in the related art, there are problems in that a gap may be formed in a portion where the water flow passage cover 50 is assembled, and foreign substances may be trapped in the gap. The foreign substances not only cause a hygienic problem but also degrade an aesthetic appearance.

SUMMARY

The present disclosure has been made in an effort to provide a tub for a washing machine, an apparatus for manufacturing the tub, and a method of manufacturing the tub, which allow a water flow passage ceiling portion and an inner side wall portion of a water flow passage to be integrally formed by injection molding when the water flow passage is formed in the tub for a washing machine, thereby omitting a water flow passage cover in the related art, and simplifying a manufacturing process.

The present disclosure has also been made in an effort to provide a tub for a washing machine, an apparatus for manufacturing the tub, and a method of manufacturing the tub, which omit a water flow passage cover for forming a water flow passage in a tub for a washing machine in the related art, thereby preventing a gap from being formed at a portion where the water flow passage cover is assembled, and preventing foreign substances from being trapped in the gap.

A technical problem to be achieved in the present disclosure is not limited to the aforementioned technical problem, and any other not-mentioned technical problem will be obviously understood from the description below by those skilled in the technical field to which the present disclosure pertains.

An exemplary embodiment of the present disclosure provides a tub for a washing machine, including: a bottom portion; an outer side wall portion which is formed to be extended along an outer circumference of the bottom portion; a water flow passage ceiling portion which is formed to be spaced apart from the bottom portion; an inner side wall portion which is formed to be spaced apart from the outer side wall portion and extended from the water flow passage ceiling portion; and a water flow passage side wall which is formed to be extended from the bottom portion, the outer side wall portion, the water flow passage ceiling portion, and the inner side wall portion, in which a water flow passage is formed by the bottom portion, the outer side wall portion, the water flow passage ceiling portion, the inner side wall portion, and the water flow passage side wall.

In the tub for a washing machine according to the exemplary embodiment of the present disclosure, a plurality of water flow passages may be formed.

Another exemplary embodiment of the present disclosure provides an apparatus for manufacturing a tub for a washing machine, including: a lower mold which is formed in a shape that corresponds to a, shape of a lower portion of the tub for a washing machine; an upper mold which is disposed above the lower mold, moved upward and downward, and formed in a shape that corresponds to a shape of an upper portion of the tub; and a sliding mold which is disposed between the lower mold and the upper mold, and slides in a horizontal direction, in which a water flow passage ceiling portion of a water flow passage is formed by the sliding mold.

A plurality of sliding molds may be provided.

Yet another exemplary embodiment of the present disclosure provides a method of manufacturing a tub for a washing machine, including: a first step in which a lower mold, an upper mold, and a sliding mold wait at initial positions; a second step in which the lower mold and the upper mold are moved upward and downward to a position where the tub is formed by injection molding; a third step in which the sliding mold is moved to a position where a water flow passage ceiling portion is formed by injection molding; a fourth step in which a liquid material is injected into the lower mold, the upper mold, and the sliding mold; a fifth step in which the sliding mold returns back to the initial position; and a sixth step in which the lower mold and the upper mold return back to the initial positions.

In the method of manufacturing the tub for a washing machine according to the exemplary embodiment of the present disclosure, the plurality of sliding molds may be provided.

Specific items of other exemplary embodiments are included in the detailed description and the drawings.

The tub for a washing machine, the apparatus for manufacturing the tub, and the method of manufacturing the tub according to the exemplary embodiment of the present disclosure ma allow the water flow passage ceiling portion and the inner side wall portion of the water flow passage to be integrally formed by injection molding when the water flow passage is formed in the tub for a washing machine, thereby omitting a water flow passage cover in the related art, and simplifying a manufacturing process.

The tub for a washing machine, the apparatus for manufacturing the tub, and the method of manufacturing the to according to the exemplary embodiment of the present disclosure may omit a water flow passage cover for forming a water flow passage in a tub for a washing machine in the related art, thereby preventing a gap from being formed at a portion where the water flow passage cover is assembled, and preventing foreign substances from being trapped in the gap.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 5 to 9 are views for explaining an apparatus and a method of manufacturing the tub fin a washing machine according to the exemplary embodiment of the present disclosure.

DETAILED DESCRIPTION

Figure 1:
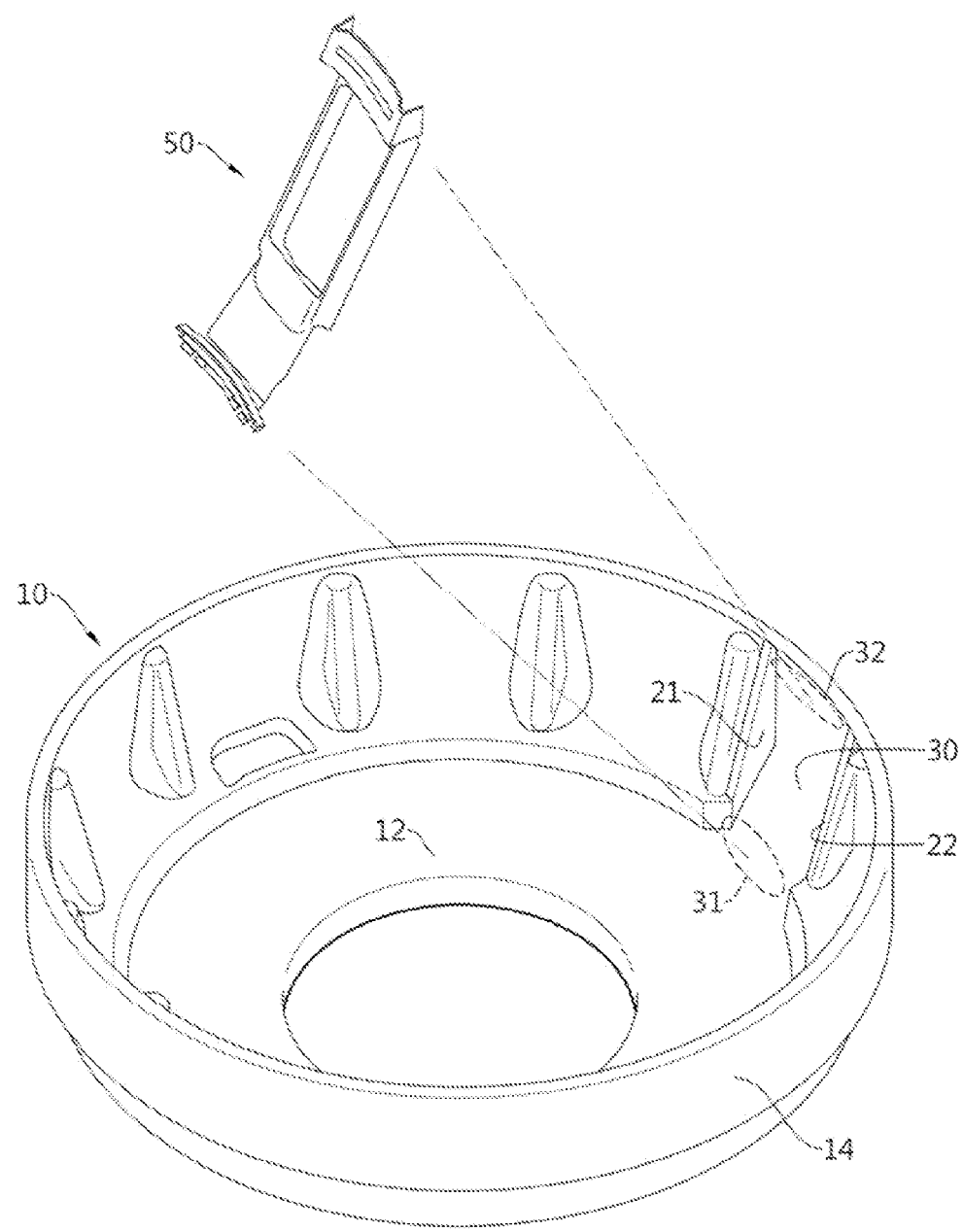
FIG. 1 is a view for explaining as tub for a washing machine in the related art.
Figure 2:
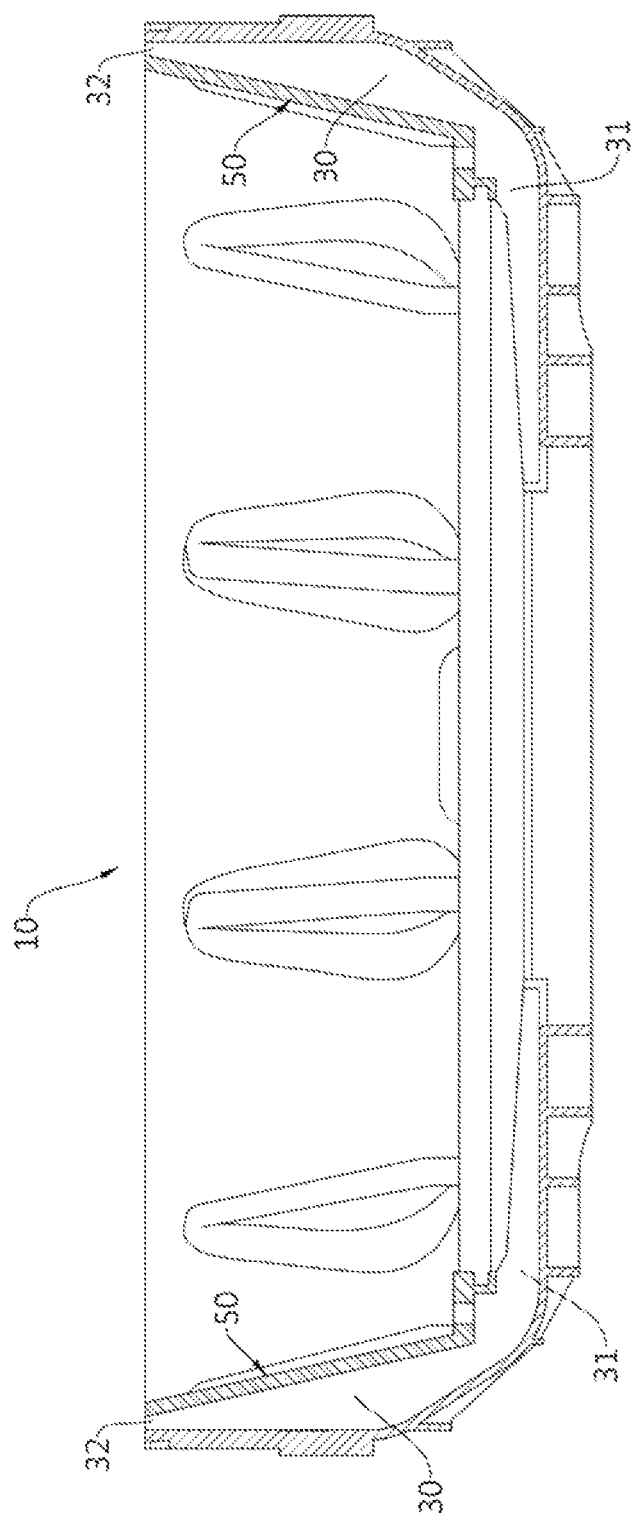
FIG. 2 is a view for explaining a configuration of a water flow passage in the tub for a washing machine in the related art.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Advantages and features of the present disclosure and methods of achieving the advantages and features will be clear with reference to an exemplary embodiment described in detail below together with the accompanying drawings.

Hereinafter, an exemplary embodiment of the present disclosure will be described in detail with reference to the accompanying drawings. It should be appreciated that the exemplary embodiment, which will be described below, is illustratively described for helping the understanding of the present disclosure, and the present disclosure may be modified to be variously carried out differently from the exemplary embodiment described herein. However, in the description of the present disclosure, detailed descriptions and specific drawings for publicly known related functions and constituent elements may be omitted when it is determined that the detailed descriptions and the specific drawings may unnecessarily obscure the subject matter of the present disclosure. For helping the understanding of the present disclosure, the accompanying drawings are not illustrated based on actual scales, but parts of the constituent elements may be exaggerated in terms of sizes.

Meanwhile, the terms used in the description are defined considering the functions of the present disclosure and may vary depending on the intention or usual practice of a manufacturer. Therefore, the definitions should be made based on the entire contents of the present specification.

Like reference numerals indicate like elements throughout the specification.

Figure 3:
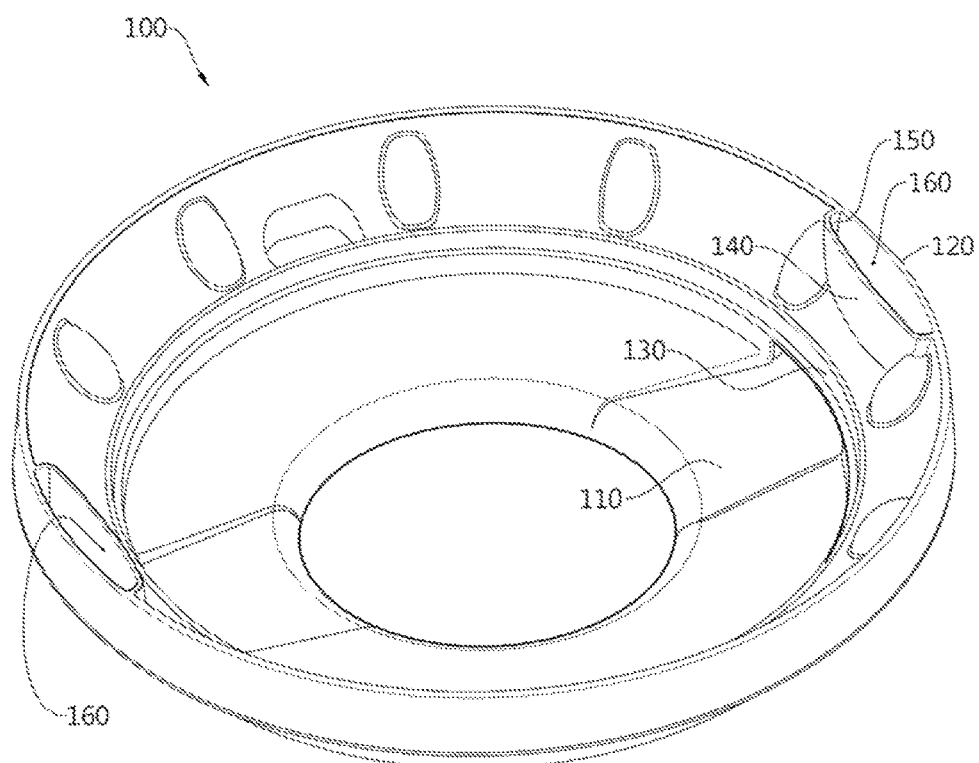
FIG. 3 is a view for explaining a tub for a washing machine according to an exemplary embodiment of the present disclosure.
Figure 4:
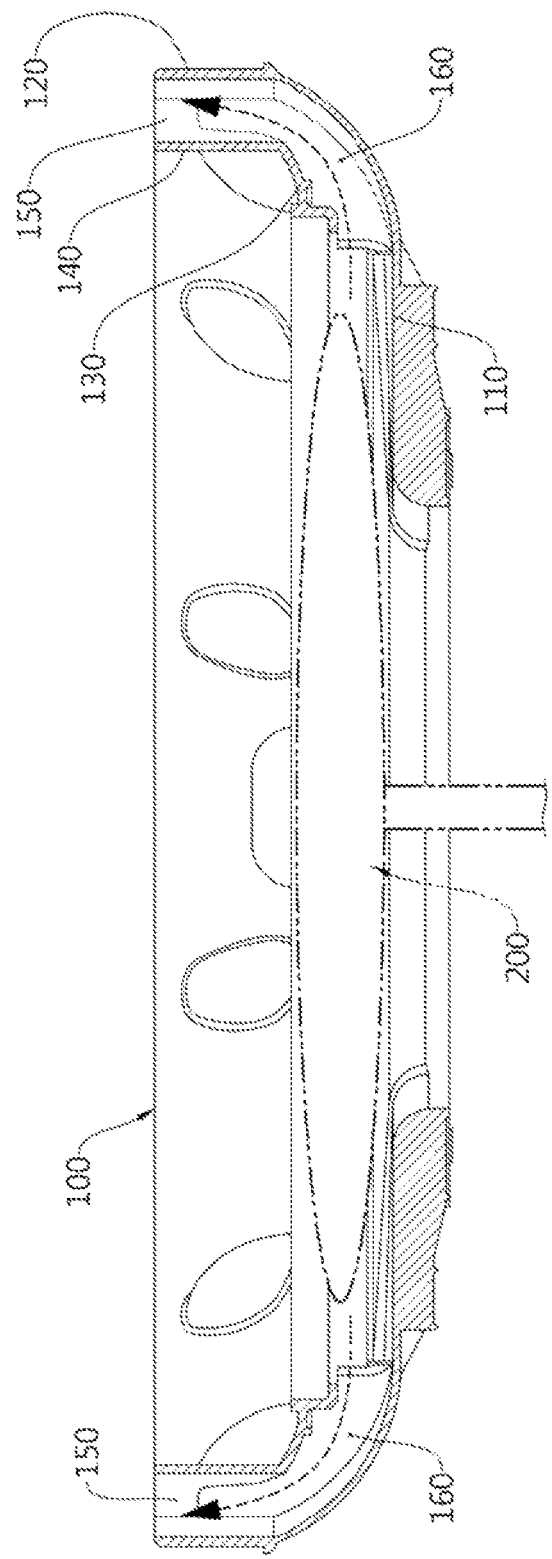
FIG. 4 is a view for explaining an operation of the tub for a washing machine according to the exemplary embodiment of the present disclosure.

Hereinafter, a tub for a washing machine according to an exemplary embodiment of the present disclosure will be described with reference to FIGS. 3 and 4. The attached FIG. 3 is a view for explaining a tub for a washing machine according to an exemplary embodiment of the present disclosure. FIG. 4 is a view for explaining an operation of the tub for a washing machine according to the exemplary embodiment of the present disclosure.

A tub 100 for a washing machine according to an exemplary embodiment of the present disclosure includes a bottom portion 110, and an outer side wall portion 120 which is formed to be extended along an other circumference of the bottom portion 110.

The tub 100 includes a water flow passage ceiling portion 130 which is formed to be spaced apart from the bottom portion 110, an inner side wall portion 140 which is formed to be spaced apart from the outer side wall portion 120 and extended from the water flow passage ceiling portion 130, and a water flow passage side wall 150 which is formed to be extended from the bottom portion 110, the outer side wall portion 120, the water flow passage ceiling portion 130, and the inner side wall portion 140.

Accordingly, a water flow passage 160 is formed by the bottom portion 110, the outer side wall portion 120, the water flow passage ceiling portion 130, the inner side wall portion 140, and the water flow passage side wall 150.

A water flow passage cover 50 is required in the related art, but in the case of the tub 100 for a washing machine according to the exemplary embodiment of the present disclosure, the water flow passage ceiling portion 130 and the inner side wall portion 140 are formed instead of the water flow passage cover 50, and as a result, it is possible to omit the water flow passage cover 50 in the related art.

In particular, the tub 100 according to the exemplary embodiment of the present disclosure may solve the problem in the related art in that foreign substances are trapped at the periphery of the water flow passage cover 50.

In the case of the tub 100 according to the exemplary embodiment of the present disclosure, the bottom portion 110, the outer side wall portion 120, the water flow passage ceiling portion 130, the inner side wall portion 140, and the water flow passage side wall 150 are integrally thrilled, such that a process of assembling the water flow passage cover 50 in the related art may be omitted when the tub 100 is manufactured, thereby reducing the number of manufacturing processes.

The tub 100 according to the exemplary embodiment of the present disclosure may have a plurality of water flow passages 160. Accordingly, a water current may flow along the plurality of water flow passages 160. The water current, which flows along the water flow passage 160, flows from an upper side of a water tub of the washing machine like a waterfall, thereby improving efficiency in washing laundry.

Meanwhile, as illustrated in FIG. 4, in a case in which the tub 100 for a washing machine according to the exemplary embodiment of the present disclosure is assembled to the washing machine, a pulsator 200 is disposed inside the tub 100. When the pulsator 200 rotates, the water current flows toward the upper side of the washing tub of the washing machine along the water flow passage 160. Therefore, the flowing water current flows into the washing tub like a waterfall, thereby improving efficiency in washing laundry.

Hereinafter, an apparatus and a method of manufacturing the tub for washing machine according to the exemplary embodiment of the present disclosure will be described with reference to FIGS. 5 to 9. The attached FIGS. 5 to 9 are views for explaining an apparatus and a method of manufacturing the tub for a washing machine according to the exemplary embodiment of the present disclosure.

An apparatus for manufacturing the tub for a washing machine according to the exemplary embodiment of the present disclosure includes a lower mold 510, an upper mold 520, and a sliding mold 530.

The lower mold 510 is formed in a shape that corresponds to a shape of a lower portion of the tub 100 for a washing machine.

The upper mold 520 is disposed above the lower mold 510 and moved upward and downward. The upper mold 520 is formed in a shape that corresponds to a shape of an upper portion of the tub 100.

The sliding mold 530 may be disposed between the lower mold 510 and the upper mold 520, and slide in a horizontal direction. Because the configuration in which the sliding mold 530 slides in a horizontal direction is made by using a technology known to those skilled in the art regarding the mold, a more detailed description will be omitted.

In the apparatus for manufacturing the tub for a washing machine according to the exemplary embodiment of the present disclosure, the water flow passage ceiling portion 130 of the water flow passage 160 is formed by the sliding mold 530.

That is, the water flow passage ceiling portion 130 is formed by injecting a liquid material into a space formed by the upper mold 520 and the sliding mold 530.

In the apparatus for manufacturing the tub for a washing machine according to the exemplary embodiment of the present disclosure, a plurality of sliding molds 530 may be provided. Accordingly, the plurality of water flow passages 160 may be manufactured.

Hereinafter, a method of manufacturing the tub for a washing machine according to the exemplary embodiment of the present disclosure will be described in a stepwise manner.

First step: a step in which the lower mold 510, the upper mold 520, and the sliding mold 530 wait at initial positions. Accordingly, when an injection molding process has been performed prior to the first step, an injection-molded product may be taken out, and the mold may be cleaned when foreign substances are present in the mold.

Second step: a step in which the lower mold 10 and the upper mold 520 are moved upward and downward to a position where the tub 100 is formed by injection molding. Accordingly, the lower mold 510 and the upper mold 520 become close to each other, and thus form a space therebetween.

Third step: a step in which the sliding mold 530 is moved to a position where the water flow passage ceiling portion 130 is formed by injection molding. Accordingly, a space is formed between the sliding mold 530 and the upper mold 520, and the space serves to form the water flow passage ceiling portion 130.

Fourth step: a step in which a liquid material is injected into the lower mold 510, the upper mold 520, and the sliding mold 530. Accordingly, the shape of the tub 100 is formed by injecting the liquid material into the spaces in the molds.

Fifth step: a step in which the sliding mold 530 returns back to the initial position. Accordingly, it is possible to prevent interference between the sliding mold 530 and an injection-molded product when the lower mold 510 and the upper mold 520 return back to the initial positions.

Sixth step: a step in which the lower mold 510 and the upper mold 520 return back to the initial positions. Accordingly, the liquid material is hardened in a solid state, and as a result, the tub 100 is completely manufactured. The completely manufactured tub 100 is taken out of the molds, and then moved to the next process.

Therefore, the method of manufacturing the tub for a washing machine according to the exemplary embodiment of the present disclosure may prevent interference with the mold devices when the water flow passage ceiling portion 130 of the water flow passage 160 is formed, and as a result, it is possible to form the water flow passage 160 well.

In the method of manufacturing the tub for a washing machine according to the exemplary embodiment of the present disclosure, the plurality of sliding molds 530 may be provided. Accordingly, the plurality of water flow passages 160 may be manufactured.

The tub for a washing machine according to the exemplary embodiment of the present disclosure, the apparatus for manufacturing the tub, and the method of manufacturing, the tub may be used to manufacture the tub for a washing machine.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method of manufacturing a tub for a washing machine, comprising:
    a lower mold, an upper mold, and a sliding mold waiting at initial positions;
    moving upward and downward, respectively, the lower mold and the upper mold to a position where the tub is formed by injection molding;
    moving the sliding mold to a position where a ceiling portion of a water flow passage forms a space in the tub;
    injecting a liquid material into the lower mold, the upper mold, and the sliding mold during the injection molding;

returning back the sliding mold to the initial position; and
returning back the lower mold and the upper mold to the initial positions.

2. The method of claim 1, further comprising providing a plurality of sliding molds.

* * * * *